United States Patent [19]

Sandgren

[11] Patent Number: 4,828,284
[45] Date of Patent: May 9, 1989

[54] TREADLE CYCLE

[76] Inventor: John A. Sandgren, 1110 Third Ave. N., Apt. #903W, Fargo, N. Dak. 58102

[21] Appl. No.: 55,999

[22] Filed: Jun. 1, 1987

[51] Int. Cl.$^4$ .............................................. B62M 1/04
[52] U.S. Cl. .................... 280/221; 272/33 B; 280/255; 280/269; 280/282; 280/87.041; D12/112
[58] Field of Search ............... 280/282, 230, 220, 221, 280/228, 238, 253, 255, 258, 263, 267, 270, 87.04 R, 269; 272/33 B, 73, 70.3; 188/24.21, 24.12, 20; 74/489, 501 R; D12/111, 112

[56] References Cited

U.S. PATENT DOCUMENTS

| | | | |
|---|---|---|---|
| 719,914 | 2/1903 | Wahlin | 188/24.21 |
| 1,440,372 | 1/1923 | Brown | 280/221 |
| 1,653,889 | 12/1927 | Clark | 280/221 |
| 1,977,035 | 10/1934 | Benjamin | 280/270 |
| 2,481,683 | 9/1949 | Polacek | 280/282 |
| 3,661,404 | 5/1972 | Bossaer | 280/255 |
| 4,186,934 | 2/1980 | Collings | 280/221 |

FOREIGN PATENT DOCUMENTS

| | | | |
|---|---|---|---|
| 2511663 | 9/1976 | Fed. Rep. of Germany | 280/221 |
| 678505 | 3/1930 | France | 280/221 |
| 1025877 | 4/1953 | France | 280/221 |
| 2562024 | 10/1985 | France | 280/255 |
| 293005 | 6/1928 | United Kingdom | 280/253 |

Primary Examiner—Charles A. Marmor
Assistant Examiner—Everett G. Diederiks, Jr.
Attorney, Agent, or Firm—Douglas L. Tschida

[57] ABSTRACT

A multi-wheeled vehicle powered via a twin treadle-acting drive train. An upright front steering assembly including a pair of tie rod coupled front wheels and steering bar-mounted gear shift and hand brake assemblies facilitate operator control of a chain-driven rear wheel. The drive train incudes left and right treadles which, via an interconnected chain and crossover sprockets, drive a rear wheel housing supported stub shaft having a pair of end-mounted, over-running sprocketed clutches, a drive sprocket and a non-reversing clutch. A derailleur-controlled drive chain transfers power from the drive sprocket to the rear wheel.

12 Claims, 5 Drawing Sheets

TREADLE CYCLE

BACKGROUND OF THE INVENTION

The present invention relates to pedal-driven wheeled vehicles and, in particular, to a vehicle operated by a standing operator via a twin treadle-actuated, rear wheel housing-mounted, non-reversing chain drive assembly utilizing an intermediate counter shaft and associated shift derailleur and braking assemblies.

In its primary application, the invention is directed to a multi-wheeled shuttle vehicle usable by warehousemen, order fillers and the like whose jobs, over the course of a day, require many short roundtrips in a warehouse complex or over other similar hard surfaces sites. Alternatively, the vehicle may be advantageously employed by all ages for recreational usage on streets, walkways or on other relatively hard-packed surfaces.

Heretofore, warehouse foremen, buyers and other warehouse personnel whose jobs require on-site inspections have been either obliged to walk or use electric carts of the golf cart type when performing their job functions about the site. From an economic standpoint, it is to be appreciated that providing such transportation for large numbers of personnel can be rather costly, given the lack of any available intermediately priced shuttle vehicles. A need exists therefore for a vehicle adaptable to such surroundings and able to withstand rugged use.

While Applicant is aware of various bicycle-like vehicles, operated by a seated operator, and some of which provide for treadle operation, such vehicles have been designed principally for recreational usage and a single user. That is, they are two-wheeled and require individual adjustment of the pedal to seat heights to accommodate the intended user. Such assemblies also provide for a limited control over speed/gear ratio, as will become more apparent hereinafter. Additionally such vehicles do not adequately meet the constraints of the above-mentioned applications, either from an industrial safety or quality perspective or from a use perspective relative to the confined spaces, aisleways and elevators in which the vehicle must operate.

One three-wheeled, cart-like vehicle of which Applicant is aware is disclosed in U.S. Pat. No. 2,707,112 and employs a pair of rear wheels which are driven via a pair of pedals coupled to a rotary, cam-acting drive train. Its single wheel steering and rotary drive assembly, however, are believed disadvantageous. That is, instead of a rotary drive, a treadle or reciprocating drive is believed preferable for applications of the present type; and especially, for a vehicle operated by a standing operator and adaptable to a large number of users potentially attired in other than work clothing.

Of the preferred reciprocating type of drive transfer mechanism, Applicant is also aware of a number of drive linkages which have been utilized in various two-wheeled bicycle applications which may be found upon directing attention to U.S. Pat. Nos. 670,715; 849,342; 2,391,809; 3,661,404; 4,052,912; 4,574,649; and 4,630,839. Various of these references disclose pedal-actuated assemblies which directly apply power to a rear wheel and various others disclose the use of an intermediate clutch-containing stub shaft. Such other assemblies however are not constructed about a rear wheel housing nor use over-running clutches in the same fashion as the subject invention.

SUMMARY OF THE INVENTION

In contrast to the above drive mechanisms, the present invention is directed to an improved combination offering advantages over those disclosed in the above-mentioned patents, although in part utilizing available bicycle hardware. In particular, the present assembly provides for an advantageous combination which enables the use of available shift derailleurs and caliper and disc braking mechanisms, along with an improved power transfer assembly. It is constructed in a stable, three wheel, cart-like configuration which is operable by a standing operator. It is also adaptable to a wide range of users, without adjustment. The operating characteristics of the vehicle additionally exhibit a relatively short turning radius, a low center of gravity and a smooth reciprocating treadle action, similar to that of walking, whereby the operator does't experience undue fatigue.

It is accordingly a primary object of the present invention to provide for a multi-wheeled vehicle adapted to standing operation within relatively confined spaces and from a relatively stable platform having a low center of gravity, short turning radius and short wheel base.

It is further object of the invention to provide for a high efficiency twin treadle-actuated propulsion mechanism which accommodates normal user walking action.

It is further object of the invention to provide for a steering bar mounted, handle-controlled, multi-speed drive chain mechanism.

It is another object of the invention to provide for a shuttle vehicle design accommodating of a variety of users, without adjustment and which is readily mounted/dismounted.

It is another object of the invention to provide a relatively stable vehicle chassis with protective housings mounted about most moving parts.

It is a still further object of the invention to provide a non-reversing drive mechanism adaptable to hand braking and including a positive locking brake.

The foregoing objects and advantages are particularly achieved in the presently preferred embodiment wherein the vehicle is constructed about a tubular frame and three wheels, two of which are coupled to a tie rod connected, upright steering bar assembly. Reciprocating power is alternately supplied via a pair of toe end, pivotally mounted platformed treadles to opposed, sprocketed over-running clutch driven ends of a stub or counter-shaft rotatively mounted to a rear wheel housing via an interconnected drive chain and crossover sprockets. Alternating depression of the treadles through normal operator walking action rotates the counter-shaft and transfers power to a contained drive sprocket and second drive chain trained about the counter-shaft drive sprocket and rear wheel. A non-reversing clutch assembly mounted to the stub shaft and housing permits transfer of power in the forward direction only. Steering bar mounted, cable or hydraulic actuated shifter and braking assemblies additionally control housing-mounted derailleur and caliper or disc brake mechanisms coupled to the rear wheel.

In one alternative embodiment, it is contemplated that the steering assembly may be constructed to fold rearwardly from its upright position onto the rear wheel housing to reduce its profile during shipping and/or transport.

In another alternative embodiment, it is contemplated that the vehicle may be constructed about a two-wheel chassis for use in recreational settings.

The foregoing objects, advantages and distinctions of the present invention, along with a detailed description of its construction, will however become more apparent hereinafter from the following description with respect to the appended drawings. Before turning attention thereto, it is to be appreciated the following description is made by way of the presently preferred embodiment only and is not intended to be all-inclusive in its description, nor should it be so interpreted. To the extent modifications or alternative embodiments may have been considered, they are described as appropriate and all deemed illustrative only of the spirit and scope of the invention as claimed hereinafter.

DESCRIPTION OF THE PREFERRED EMBODIMENT

Figure 1:
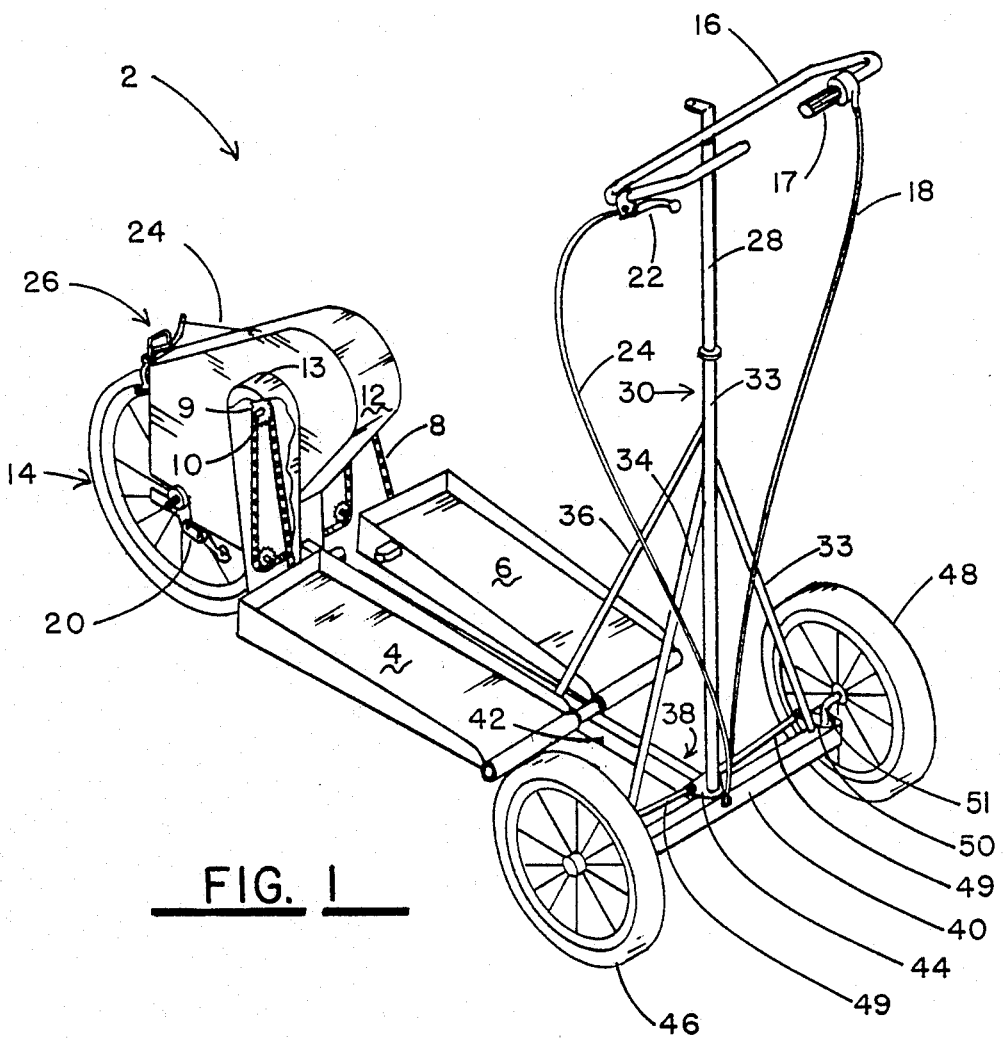
FIG. 1 shows an assembled perspective view of the invention.

Turning attention to FIG. 1, an assembled perspective view is shown of a three-wheeled embodiment of the present invention. Generally, it comprises a twin treadle-operated vehicle 2 which is propelled by an upright standing operator. Propulsion is achieved by the operator alternately shifting his/her weight onto the platform of the uppermost treadle 4 or 6, which transfers power via the rearwardly positioned, crossover-mounted drive chain 8 and sprockets 9 (only one of which can be seen) mounted to the opposed ends of an overlying, covered intermediate stub or counter-shaft 10. Over-running clutches mounted between the stub shaft 10 and end sprockets 9 provide a uni-directional rotation of the shaft 10, reverse rotation is prevented via an intermediate non-reversing clutch assembly mounted to the shaft 10 beneath the housing 12.

The rotation of the shaft 10 rotates a contained drive sprocket and rear drive chain (not shown) which is trained about a sprocketed rear wheel 14. A variety of drive to rear wheel sprocket ratios, relative to vehicle speed, are selectively established via a steering bar 16 mounted, twist grip controller 17 which via a cable 18 axially displaces a housing-mounted derailleur 20 to appropriately shift the drive chain about a desired rear wheel sprocket. A hand-gripped brake lever 22, also mounted to the steering bar 16 and including a cable 24, allows the operator to controllably brake the rear wheel 14 via a pivotally mounted caliper brake assembly 26 mounted to the rear end of the housing 12. While a caliper brake assembly is adequate for most applications and anticipated loading, it is to be appreciated a hydraulic disc brake assembly might also be used, for example, of the type using a 7-inch rotor. A larger braking surface provides better stopping characteristics under a variety of weather conditions which is important since the vehicle 2 has application at hardpacked outdoor storage sites.

Vehicle steering is achieved via the U-shaped padded steering bar 16 which, with operator applied hand pressure, induces rotation of an upright rotating steering shaft 28 within the supported housing assembly 30. The housing assembly 30 particularly comprises a steering shaft 28 receiving outer tubular column member 32 supported in a tripod fashion via struts 33, 42 and 36 which are boltably mounted to a tubular T-shaped chassis 38 at a front cross member 40 and a longitudinal center member 42. Rotation of the upright steering shaft 28 induces rotation of a lower-lying end-mounted triangular plate 44 which is coupled to the right and left front wheels 46 and 48 via length adjustable tie rods 49. Each tie rod 49 is, in turn, coupled to an idler arm 50 which extends rearward from a 7-shaped stub axle 51 mounted through the hub of each wheel 46, 48 and to the ends of the crossover member 40.

Vehicle performance is enhanced via the use of pneumatic wheels 14, 46 and 48, and the axles of which are supported in associated roller bearing assemblies to minimize parasitic drag and power loss. As will become more apparent herinafter, power transfer is further enhanced via the aforementioned over-running clutches which ensure that power is smoothly transferred to the counter-shaft 10 throughout the power stroke of each treadle 4 and 6, as operator weight is shifted from one treadle to the other and whereat a wear-enhancing and operator fatiguing jerking effect might otherwise be encountered.

It is to be appreciated further that, although the treadles 4, 6 operate similar to the prior art pedals, they allow the operator to change his/her relative standing location forward or backward along the treadle and thereby control the length of power stroke or arcuate travel of the treadle. Not only therefore may speed be varied without a separate shift assembly, but the vehicle 2 self-adjusts to operators having different leg lift actions. This is especially important to reduce fatigue and to accommodate the variety of riders who may operate the vehicle 2.

From a dimensional standpoint, the vehicle 2 exhibits an approximate over-all length of 40 inches and a width of 22 inches. The pneumatic front wheels 46 and 48 are approximately 12 inches in diameter and the rear wheel 14 is 16 inches in diameter. Each treadle 4 and 6 is approximately 5 inches wide by 11 inches long, tapers from a 7 inch front width to a 4 inch rear width and are separated laterally to provide for an operator width of stance of approximately 12 inches. Such a width of stance has been found to provide excellent stability and comfortably accommodate substantially all users. The relative displacement of the components are also designed to center the vehicle's center of gravity about the treadle's 4, 6 and thus the combined center of gravity for the vehicle plus rider remains centered at the treadles within a "stability triangle" formed by the three wheels.

Depending upon the intended user, it is to be appreciated the height of the front steering assembly 30 and steering shaft 28 may have to be adjusted by using a telescoping shaft 28; although for the adult version, an approximate height of 48 inches from the plate 44 to the steering bar 16 has been found acceptable. Additionally, the steering bar 16, as depicted, is mounted to angulate slightly forward form the shaft 28, which tends to shift the operator weight in the direction of a turn, thus providing greater dynamic stability.

By way of other general comments, it is to be appreciated the use of two front wheels enhances the vehicle's dynamic stability over a design employing two rear wheels, while facilitating the use of available chain derailleurs 20 and caliper brakes. Also, a minimal turning radius is achievable therewith which, as mentioned, is advantageous for the intended application.

Figure 2:
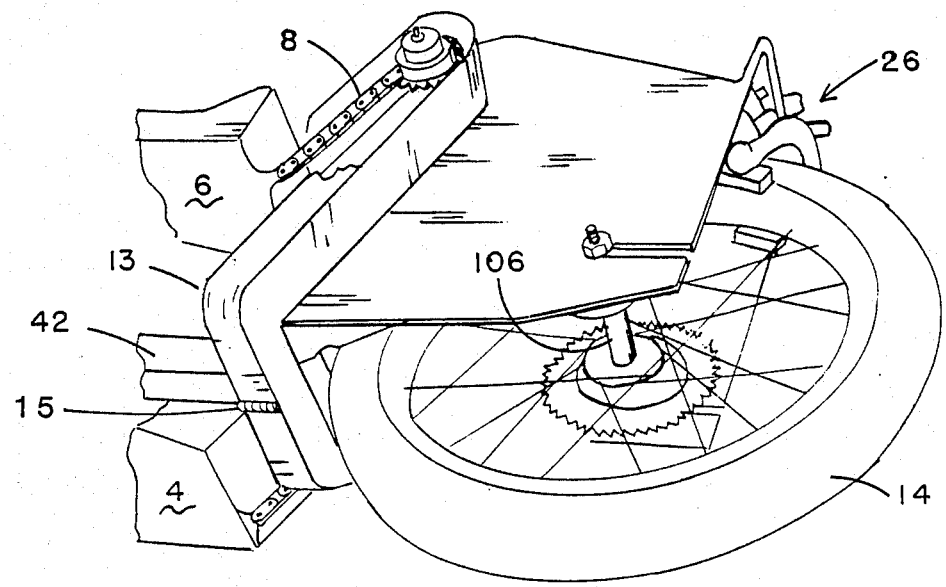
FIG. 2 shows a perspective view of a chain cover assembly.

Referring next to FIG. 2, it shows a perspective view of the hinged chain cover 13 which mounts via a bracket (not shown) to the ends of the crossover sprockets and about the path of travel of drive chain 8. A bottom center hinge 15 allows each cover half to be pivoted to expose the drive chain 8 should access be necessary. Normally though the cover halves are secured to the housing 12 with small screws.

Figure 3:
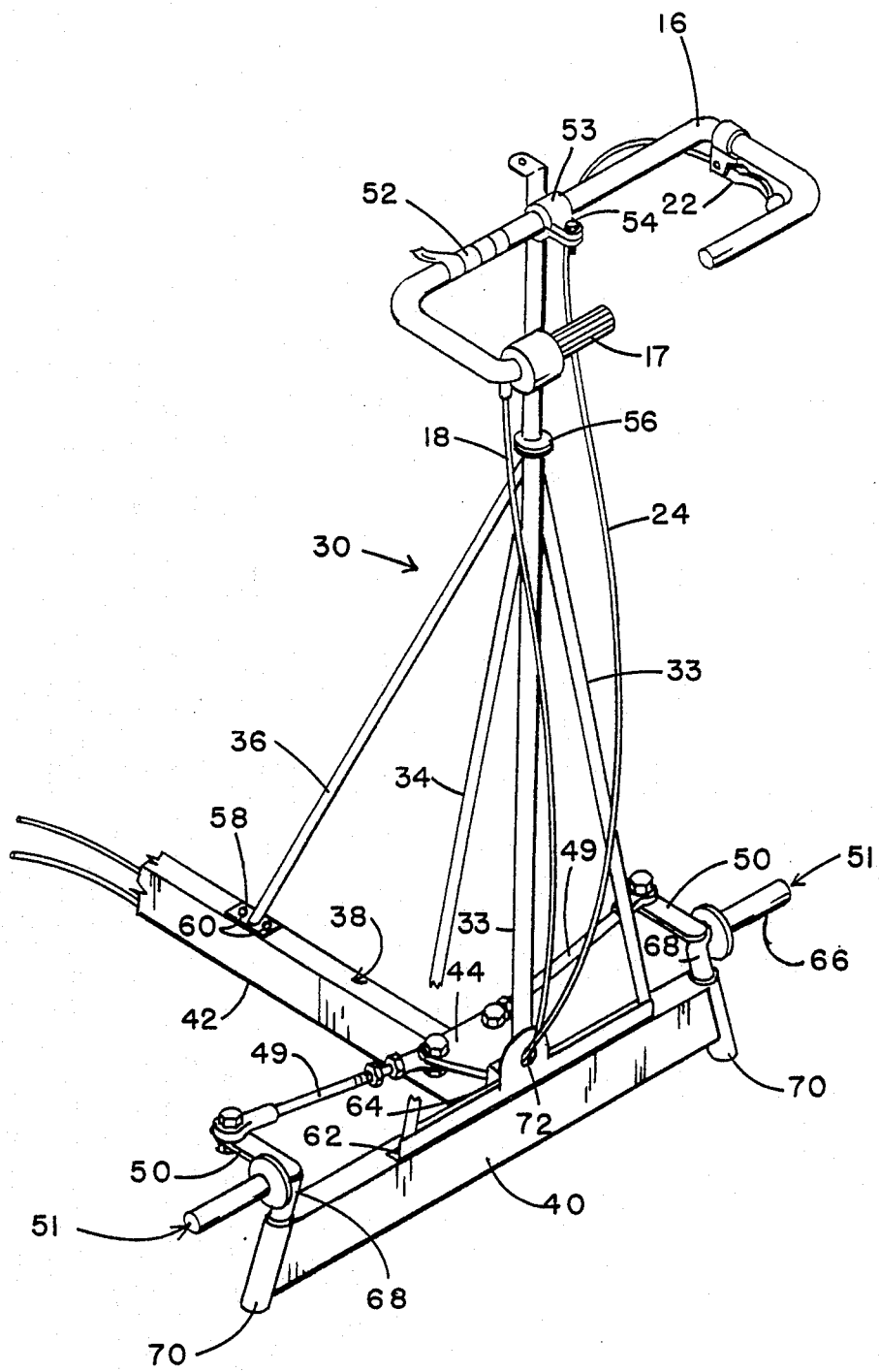
FIG. 3 shows a detailed assembly view in perspective of the front steering assembly of the vehicle of FIG. 1.

With continuing attention to FIG. 1 and additional attention to FIG. 3, a detailed view is shown in perspective of the front wheel steering assembly 30. Generally, it again comprises a steering bar 16 which is covered with a padded wrapping 52 for comfort and safety. The steering bar 16 is secured to the vehicle 2 at a bolted, split clamp member 53 attached to the upper end of steering shaft 28. Upon loosening the bolt 54, the steering bar 16 may be rotated to a desired orientation relative to the upright 28, although the forwardly disposed mounting shown is preferred for the reasons mentioned previously.

Concentrically mounted about and supporting the steering shaft 28 is the outer tabular housing 32 which is supported in upright relation to the lower cross-frame assembly 40 via the struts 33, 34 and 36, which are weldably secured at their upper ends to a collar 56 secured to the upright 32. The lower end of the strut 36 is mounted to the longitudinal frame member 42 via an intermediate drilled weldment 58 and bolt/nut fasteners 60 extending upwardly from the frame member 42. The lower end of the struts 33 and 34 are welded to the opposite ends of a drilled angle iron member 62 which mounts along the top of the cross-member 40 via bolt-/nut fasteners extending therefrom.

Midway between the welded ends of the struts 33 and 34 is a rectilinear welded box member 64 to which the lower end of the column 32 is welded and which box weldment 64, in turn, is welded to the angle iron member 62. Secured to the bottom end of the steering shaft 28 and rotatively extending outwardly from the box weldment 64 is the drilled triangular steering plate member 44 and to which the inner ends of each tie rod 49 are turnbuckle-coupled at a pivot joint. The outer end of each tie rod 49 is similarly coupled to one of the idler arms 50 which are weldably secured to the L-shaped stub axles 51.

Each stub axle 51, in turn, comprises a shouldered axle portion 66 which mounts in bearing-supported relation to the hub of each front wheel 46 and 48. An inner, downwardly projecting portion 68 mounts within a tubular pivot member 70 welded to each end of the cross-member 40. Each pivot member 70 is offset inwardly i.e. toed-in from a perpendicular vertical axis approximately 10 degrees which minimizes the turning radius of the front wheels 46 and 48 and stabilizes the entire steering assembly.

In passing, it is to be noted that the brake and shift cables 24 and 18 are typically secured to the upright column 31 via a number of cable ties at their upper end, while at their lower end they are threaded through the longitudinal frame member 42 via an access port 72 at the juncture between the cross-member 40 and frame member 42 to minimize exposure to road hazards.

Appreciating too that for those instances where one might desire to transport the vehicle 2, the above described upright steering assembly 30 may make this difficult for many vehicles. For these instances, it is comtemplated that the steering assembly 30 would be hingeably mounted to the cross-member 40 such that the entire assembly could be tilted back onto the rear housing 12. In particular, it is contemplated that the angle iron cross-member 62 would be hinge mounted to the cross-member 40, while the struts 33, 34 and 36 each would be of a lockable, telescoping construction, while the weldment 58 would be constructed to allow a pivoting of the lower end of the strut 36. Upon releasing the clamps securing the struts in their rigid upright mounting positions, the entire assembly could be pivoted rearwardly. Also, it is contemplated that the turnbuckle mounting of the tie rods 49 to the idler arms 50 and inner pivot plate 44 would allow a slight amount of rotation thereat.

Figure 4:
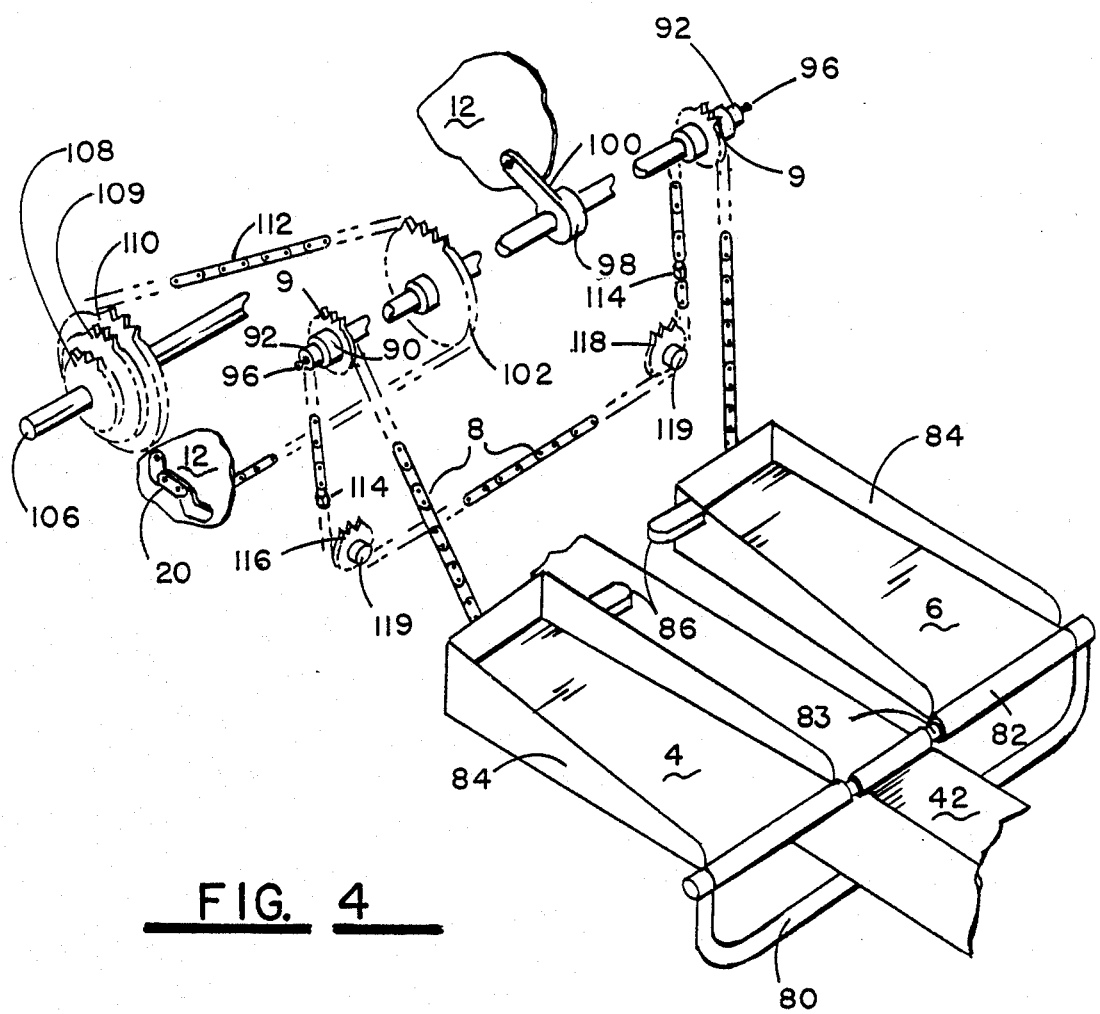
FIG. 4 shows an exploded perspective view of the power transfer assembly of the vehicle of FIG. 1.

Referring next to FIG. 4, a detailed perspective view is shown of the vehicle 2's drive train or propulsion assembly. Before referring thereto, it is to be appreciated the spacing of the various sprockets mounted to the counter shaft 10 are exaggerated for purposes of detail and the present description. In practice, though, the shaft 10 is approximately 8 inches long. The drive train starts at the twin platformed treadles 4 and 6, each of which include a transverse tubular pivot member 80 welded at their forwardmost ends. Each tubular member 80, in turn, is pivotally mounted about a rectangular, rod stock, framework 82 which is weldably secured at its midpoint to the top and bottom of the frame member 42. Bearings at the inner and outer ends of each tubular member 80 support each treadle from the upper pivot arm 83 of the framework 82. A raised edge or foot guard 84 also mounts about each treadle's periphery.

Mounted to the back center of each treadle is the crossover-mounted drive chain 8. Operator contact with the chain 8 is prevented via the raised foot guard 84 which along with the hinged chain cover 13 discussed in FIG. 2 prevents the operator's foot from sliding off the rear or sides of the treadles and assists in locating the center treadle surface, if contact is lost and without looking at the treadles.

Mounted slightly forward of the heel portion of each foot guard 84, along the inner side surface of each treadle, is a padded right angled stop weldment 86 which extends inwardly and contacts the top of the frame member 42. The weldments 86 act as treadle stops and limit treadle travel relative to the ground, whereas their upper travel is limited by the length of the chain 8 and its mounting relation to the end sprockets 9 on the counter-shaft 10. As presently configured, an approximate maximum of 6 inches of vertical chain/treadle travel is provided, although the operator, again, can infinitely vary the stroke length by varying his/her foot position on the treadles or the height of his/her leg lift. This range is also believed sufficient to accommodate concerns regards fatigue and leverage necessary to ascend hills, etc.

Figure 5:
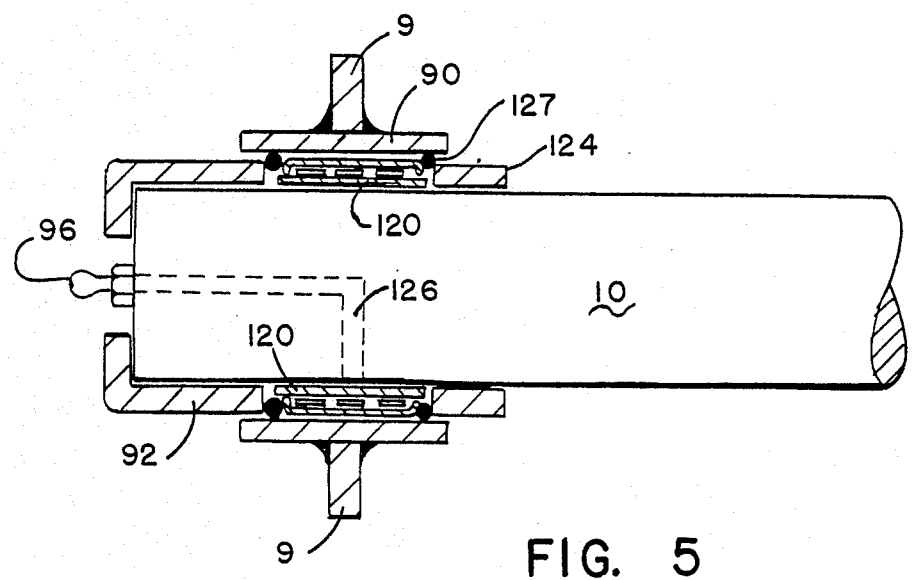
FIG 5 shows a detailed cross-section view through one of the sprocketed over-running clutch assemblies.

In this latter regard, it is to be noted the crossover chain 8 as it rises from each treadle 4, 6 is trained about the sprockets 9 mounted to the opposite ends of counter shaft 10. The sprockets 9 are welded to bushing-like housings 90 which are press fit onto the ends of counter-shaft 10 and which surround the over-running clutches 92 (one of which is shown in FIG. 5). Extending from the cap covered extreme ends of the counter-shaft 10 are grease fittings 96 which via an internally formed passageway provides grease to the interior of each clutch assembly.

Mounted also midway along the counter-shaft 10 is a third over-running clutch assembly 98 which includes a link arm 100 which is welded to the side of bushing 90 and which bolts to the housing 12. The clutch assembly 98 is mounted in reverse orientation to the end clutches, which via the anchor arm 100, prevents the counter-shaft 10 from rotating in a reverse direction and prevents the vehicle 2 from accidentally rolling backwards. Also, set screw mounted along the counter-shaft 10 is a primary drive sprocket 102. Mounted, in turn, to the axle 106 of rear wheel 14 are a number of sprockets 108, 109 and 110 of differing diameters and, at all times, about one of which rear wheel drive chain 112 is trained via the intermediate housing 12 mounted dereailleur assembly 20. Depending upon the speed range desired, the control arm of the derailleur 20 is laterally displaced one side or the other to pre-defined detents to induce the chain 112 to shift onto one of the correspondingly aligned sprockets 108, 109 or 110 in conventional fashion. In the preferred embodiment, an indexed derailleur assembly 20 is used that is manufactured by Shimano.

Returning attention to the crossover chain 8, it is to be appreciated that after passing over the end sprockets 9, a 90-degree transition linkage member 114 provides a 90-degree twist in the chain 8 to align it with a pair of lower-lying crossover sprockets 116 and 118. Each of the sprockets 116 and 118 are rotatively mounted to a stub axle 119 which are secured to and extend from the bottom of the housing 12. In passing, it is to be noted the transition members 114 are mounted to the chain 8 relative to the chain's travel extremes so as never to actually rotate about either of the sprockets 9, 116 or 118, but rather merely rise and fall with the chain 8 in the space between the sprockets and beneath the chain cover 13.

With continuing attention to FIG. 4 and additional attention to FIG. 5, a detailed cross-section view is shown through one of the end mounted over-running clutch assemblies. From this view, an appreciation can be had that each clutch assembly includes a hardened race 120 which is press fit over the counter-shaft 10. An over-running clutch 122 then mounts over the race 120 within the press fit sprocket 9 containing outer bushing 90. In the presently preferred embodiment, the over-running clutch/bearing assemblies are manufactured by the Torrington Company and have a nominal 1-inch diameter bore and a 412-pound force inch torque rating, which is deemed sufficient for a vehicle/operator loading of up to 250 pounds. Set screw mounted to the counter-shaft 10 at an interior edge of the bushing 90 is an inner stop member 124. Similarly, set screw mounted to the outer end of the counter-shaft 10 and about each end-mounted zerk fitting 96 is the cap bushing member 92. Bored interiorly of the shaft 10 is the lubricant passageway 126, which lubricant is maintained in the space surrounding the clutches 120 via "O" ring seals 127.

While not shown in detail, it is to be appreciated that the non-reversing over-running clutch assembly 98 is similarly constructed, although again the clutch/bearing assembly 120 is reverse-mounted and the linkage arm 100 is welded at one end to the outer bushing 90 and secured at its other end to the housing 12. The assembly 98 is also secured to the counter-shaft 10 with set screw stops.

Figure 6:
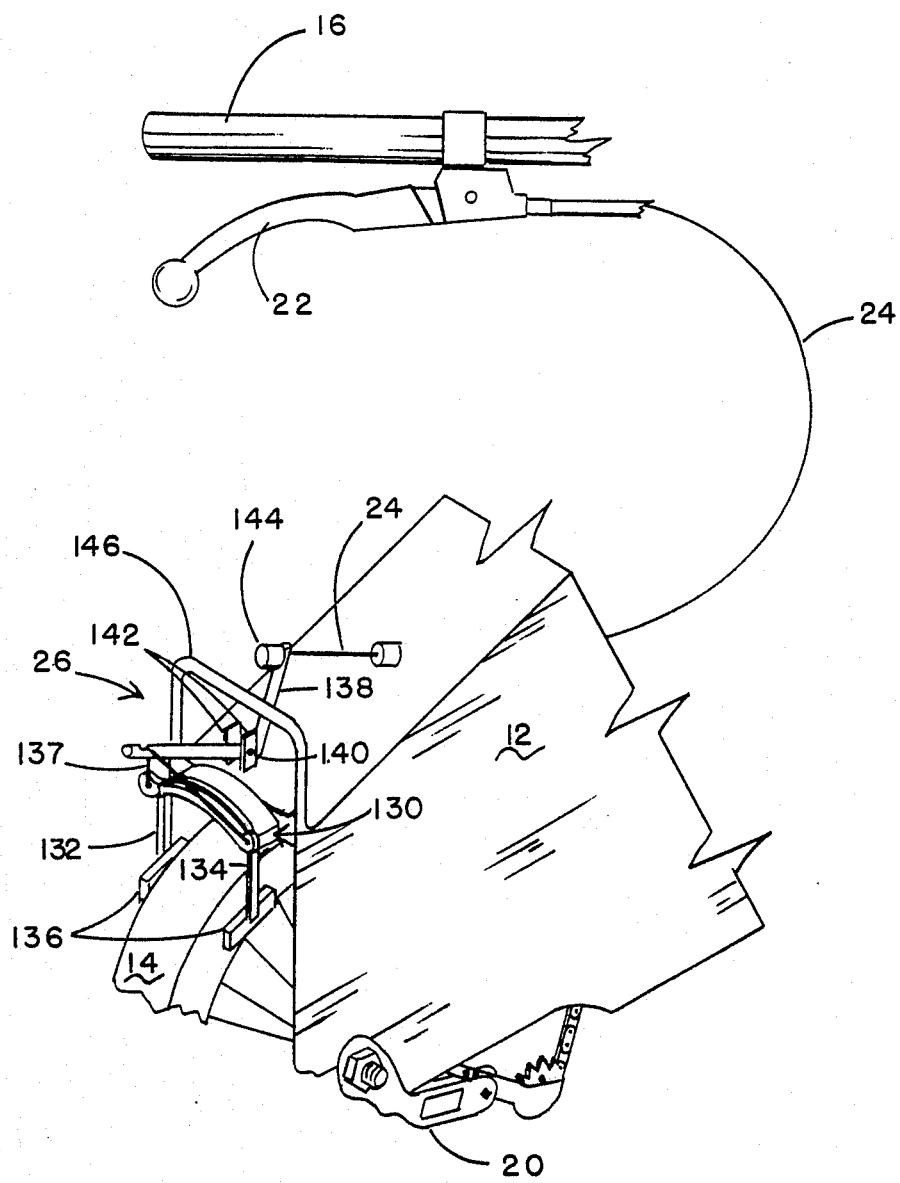
FIG. 6 shows a detailed perspective view of the braking assembly of the vehicle of FIG. 1.

Re-directing attention to FIG. 3 and with additional attention to FIG. 6, a detailed perspective view is shown of the braking assembly 26 presently employed with the invention. As mentioned, a conventional caliper-type bicycle brake assembly 130 is used which is comprised of a pair of pivotally-mounted, C-shaped arms 132 and 134, the inner ends of which are mounted to individual brake pads 136 which contact the rim of rear wheel 14. The upper end of each brake arm 132 and 134 is coupled to a short looped length of cable 137 which, in turn, mounts in a notch formed in an 7-shaped member 138 which is pivotally mounted via a pivot pin 140 passing to a pair of housing-mounted brackets 142.

The extreme end of the brake cable 24 projects through the housing 12 and an aperture in the end of the 7-shaped member 138 and is secured thereto via a cable stop 144. A surrounding U-shaped bracket 146, welded to the housing 12, protects the assembly 26 from damage, should the vehicle 2 tip over, etc.

In operation, a rider upon depressing the handle lever 22, induces a pivoting action at the member 138, which causes the cable to contract the caliper arms 132 and 134 and brake pads 136 against the wheel rim. Upon releasing the lever 22, springs (not shown) cause the caliper arms to retract. In passing, it is to be noted the brake cable 24, after exiting the frame member 42, is curved and secured to the inner arcuate forward surface of the housing 12 so as not to be kinked or otherwise bent too sharply to the point where it affects the braking operation.

Figure 7:
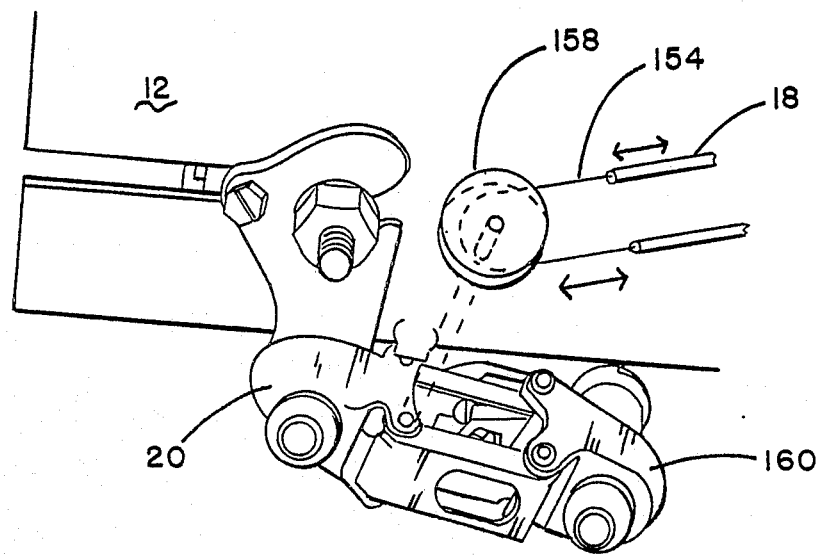
FIG. 7 shows a detailed perspective view of the gear shifting assembly of the vehicle of FIG. 1.

With still further attention directed to FIG. 7, it is to be recalled that a conventional chain derailleur 20, in addition to the mentioned treadle control, is employed to provide multiple speed ranges. FIG. 7 accordingly depicts the manner in which the necessary lateral motion is induced in the derailleur 20 to shift the drive chain 112 to desired ones of the sprockets 108, 109 or 110. That is, the steering bar 16 mounted shift assembly 17 is coupled to the upper ends of the looped shift cable 18 and whereat the cable ends terminate within the housing 152 in a fashion whereby the twisting of the grip 150 induces a corresponding pulling of the center braided cable portion 154.

The hand-controlled cable motion is translated at the derailleur 20 by way of a cam-acting horizontally mounted grooved wheel 158 whereat the opposite cable ends terminate. The wheel 158, which is shown in exploded assembly, mounts to a vertical pivot 159 and behind the exposed plate 161 of the lateral position adjusting portion of derailleur 20. The wheel 158 replaces a conventional threaded cable termination coupler which lacks the speed and precision desired when used with the present invention. Accordingly, the wheel 158 is substituted and includes grooved recesses (not shown) wherein the cable 154 is received and secured to the wheel 158. The wheel 158 is formed with a cam-like outer edge which cooperates with the lateral adjustment arm 160. As the grip 150 is rotated, the cable 154 is extended or retracted and the wheel 158 is rotated either clockwise or counterclockwise. The adjuster arm 160 correspondingly moves in or out to align with predefined detents whereat the chain 112 is aligned with the various sprockets 108, 109 or 110.

Figure 8:
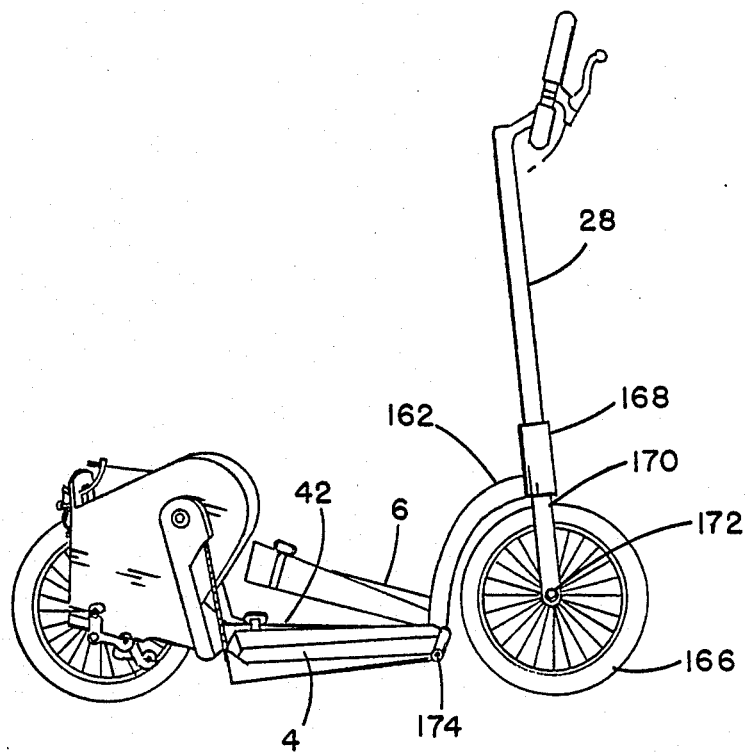
FIG. 8 shows a partial elevation view of a two wheel version of the vehicle of FIG. 1.

Lastly, by way of still another alternative embodiment, attention is directed to FIG. 8 wherein a partial elevation view is shown of a two-wheeled version of the present invention. This embodiment is intended more for recreational usage, although may be used in commercial applications, and resembles a push-type scooter. For this embodiment, the front end of the chassis 38 is modified to accomodate a single front wheel which typically would be similar in size (e.g. 14 inch diameter) to the rear wheel. That is, in lieu of a crossover member 40 and longitudinal member 42, the chassis 38 is constructed with a singular tubular frame member 162 which arcuately rises from member 42 and curves about a rear portion of a single front wheel 166, before being secured at its forwardmost end to an upright support column 168. As before, the steering shaft 28 mounts in the column 168; however, in this instance, the lower end is constructed more in the fashion of a conventional fork assembly 170 and which is supported from the front wheel axle 172. Otherwise, the remainder of the vehicle remains the same in its basic concept, except that vehicle is narrowec and the treadle pivots 174 mount at a slight upward incline to the plane of the ground to reduce the chances of the outer treadle ends striking the ground on turns.

While the present invention has been described with respect to its presently preferred and various alternative embodiments and modifications thereto, it is to be appreciated that still other modifications may suggest themselves to those of skill in the art. Accordingly, it is contemplated that the following claims should be interpreted to include all those equivalent embodiments within the spirit and scope thereof.

What is claimed is:

1. A wheeled vehicle comprising:
   (a) a tubular T-shaped chassis having a longitudinal member and a forward end mounted cross member;
   (b) a pair of rotatively mounted front wheels;
   (c) steering means including a handle bar, a vertically telescoping steering column and steering shaft coupled with tie rod means coupled to a pair of 7-shaped axles rotatively mounted to said cross member and supporting said front wheels in toed-in relation to said chassis, said steering column rotatively supported from said chassis via a plurality of strut members coupled therebetween;
   (d) first and second platformed treadles including stop members contacting said longitudinal chassis member and pivotally coupled at a forward end to said chassis to arcuately rise and fall with operator applied foot pressure;
   (e) a housing having side, top and front walls mounted to the rear end of said chassis;
   (f) a multi-sprocketed rear wheel rotatively supported from and substantially surrounded by said housing;
   (g) a counter-shaft rotatively mounted to said housing in overlying relation to said treadles and including a pair of opposed end-mounted sprockets, an intermediate drive sprocket and non reversing clutch means, each end sprocket rotating about a unidirectional over-running clutch means and said non reversing means including a counter rotatively mounted clutch means for preventing the reverse rotation of said counter shaft;
   (h) first and second crossover sprockets rotatively mounted to said housing;
   (i) a first drive chain including a pair of 90 degree transition members having opposite ends coupled to the rear ends of said first and second treadles and trained about said end sprockets and said crossover sprockets, whereby an alternate rising and falling of said treadles rotates said drive sprocket;
   (j) a second endless drive chain trained about said drive sprocket and one of the rear wheel sprockets;
   (k) cable-actuated means mounted to said housing for controllably braking said rear wheel; and
   (l) cable-actuated means including a rotatively mounted cam member cooperatively mounted relative to a spring-biased drive chain displacement member mounted to said housing for laterally selectively shifting said second drive chain about a selected one of said rear wheel sprockets.

2. A wheeled vehicle driven by an upright operator comprising:
   (a) a tubular T-shaped chassis having a longitudinal member and a forward end-mounted cross member;
   (b) a pair of front wheels rotatively mounted in toed-in relation to said chassis to axles extending from outer cross member ends;
   (c) steering means including a vertical steering column, a handle bar directed rotatable steering shaft supported in said steering column and tie rod coupled to the axle of each of said front wheels and wherein said steering column is supported from said chassis via a plurality of strut members coupled therebetween;
   (d) first and second platform treadles, each pivotally coupled at a forward end to said chassis and including a stop member laterally projecting to contact said chassis at the lowermost treadle travel extreme and a peripheral upright heel guard;
   (e) a wheel housing having side, top and forward end walls mounted at the forward end wall to the rear of said chassis;
   (f) a rear wheel including a plurality of laterally displaced sprockets of differing diameters rotatively supported from and substantially surrounded by said wheel housing;
   (g) a counter-shaft rotatively mounted through the side walls of said wheel housing in overlying relation to the rear ends of said treadles and including a pair of opposed end-mounted sprockets and a drive sprocket therebetween, each end sprocket mounted exteriorly of said wheel housing side walls and rotating about a unidirectional over-running clutch means, and means for lubricating each of the end mounted clutch means;
   (h) first and second crossover sprockets rotatively mounted to the forward end wall of said wheel housing;
   (i) a first drive chain having opposite ends coupled to a rear end of each of said first and second treadles and trained about the counter shaft end sprockets and said crossover sprockets, whereby the alternate rising and falling of said treadles rotates said drive sprocket;
   (j) a second endless drive chain trained about said drive sprocket and one of said plurality of rear wheel sprockets;
   (k) brake means comprising:

(i) a pair of pivotally mounted brake pad containing caliper arms;
(ii) a crossover cable mounted between an opposite end of each of said arms; and
(iii) an L-shaped member pivotally mounted to the top wall of said housing and coupled at one end to said crossover cable and at an opposite end to a hand lever actuated cable extending from said handle bar whereby said caliper arms are compressed and released with hand action relative to said rear wheel;

(l) cable-actuated chain shift means mounted to said handle bar and including a rotatively mounted cam member at said wheel housing having at least one laterally ramped surface cooperatively mounted relative to a spring-biased second drive chain displacement member for controllably rotating said cam member to laterally displace said chain displacement member and second drive chain into selected engagement with one of said rear wheel sprockets; and (m) a third over-running clutch means mounted to said counter-shaft in counter-relation to the end mounted clutch means and including an arm member rigidly coupled to said wheel housing whereby reverse rotation of said wheel is prevented.

3. A wheeled vehicle comprising:
(a) a tubular T-shaped chassis having a longitudinal member and an end mounted cross member;
(b) a pair of front wheels mounted to the cross member;
(c) steering means including a handle bar, a vertical rotatable steering column tie rod coupled to each of said front wheels;
(d) first and second platform treadles pivotally coupled to said chassis to arcuately rise and fall with operator applied foot pressure;
(e) a housing mounted to the rear of said chassis;
(f) a sprocketed rear wheel rotatively supported from said housing and including a plurality of laterally displaced sprockets of differing diameters and means mounted to said housing including a rotatively mounted cam member having at least one outer raised surface cooperatively mounted relative to a spring-biased second drive chain displacement member for controllably rotating said cam member and laterally selectively shifting said second drive chain about a selected one of said rear wheel sprockets;
(g) a counter-shaft rotatively mounted to said housing in overlying relation to said treadles and including a pair of opposed end-mounted sprockets and a drive sprocket therebetween, each end sprocket rotating about a respective unidirectional over-running clutch means;
(h) first and second crossover sprockets rotatively mounted to said housing;
(i) a first drive chain having opposite ends coupled to each of said first and second treadles and trained about said end sprockets and said crossover sprockets, whereby the alternate rising and falling of said treadles rotates said drive sprocket; and
(j) a second endless drive chain trained about said drive sprocket and rear wheel sprocket.

4. Apparatus as set forth in claim 3 wherein said handle bar includes a rotatively mounted hand grip portion coupled via a cable to said cam member for selectively shifting said second drive chain with the rotation of said hand grip portion.

5. A wheeled vehicle comprising:
(a) a tubular T-shaped chassis having a longitudinal portion and an end mounted cross portion;
(b) a pair of front wheels mounted to the cross portion;
(c) steering means including a handle bar, a vertical rotatable steering column tie rod coupled to each of said front wheels;
(d) first and second platform treadles pivotally coupled to said chassis to arcuately rise and fall with operator applied foot pressure;
(e) a housing mounted to the rear of said chassis;
(f) a sprocketed rear wheel rotatively supported from said housing;
(g) a counter-shaft rotatively mounted to said housing in overlying relation to said treadles and including a pair of opposed end-mounted sprockets and a drive sprocket therebetween, each end sprocket rotating about a respective unidirectional over-running clutch means;
(h) first and second crossover sprockets rotatively mounted to said housing;
(i) a first drive chain having opposite ends coupled to each of said first and second treadles and trained about said end sprockets and said crossover sprockets, whereby the alternate rising and falling of said treadles rotates said drive sprocket;
(j) a second endless drive chain trained about said drive sprocket and rear wheel sprocket; and
(k) cable-actuated means for controllably braking said rear wheel, wherein said brake means comprises;
(i) a pair of pivotally mounted brake pad containing caliper arms;
(ii) a crossover cable mounted between an opposite end of each of said arms; and
(iii) an L-shaped member pivotally mounted to said housing and coupled at one end to said crossover cable and at an opposite end to a hand lever actuated cable extending from said handle bar whereby said caliper arms are compressed and released.

6. A wheeled vehicle comprising:
(a) a tubular T-shaped chassis having a longitudinal portion and an end mounted cross portion;
(b) a pair of front wheels mounted to the cross portion;
(c) steering means including a handle bar, a vertical rotatable steering column tie rod coupled to each of said front wheels;
(d) first and second platform treadles pivotally coupled to said chassis to arcuately rise and fall with operator applied foot pressure;
(e) a housing mounted to the rear of said chassis;
(f) a sprocketed rear wheel rotatively supported from said housing;
(g) a counter-shaft rotatively mounted to said housing in overlying relation to said treadles and including a pair of opposed end-mounted sprockets and a drive sprocket therebetween, each end sprocket rotating about a respective unidirectional over-running clutch means;
(h) first and second crossover sprockets rotatively mounted to said housing;
(i) a first drive chain having opposite ends coupled to each of said first and second treadles and trained about said end sprockets and said crossover sprockets, whereby the alternate rising and falling of said treadles rotates said drive sprocket;

(j) a chain housing mounted at a bottom end of said wheel housing and portions of which extend about said first drive chain, crossover sprockets and the opposed ends of said counter-shaft; and (k) a second endless drive chain trained about said drive sprocket and rear wheel sprocket.

7. A wheeled vehicle comprising:

(a) a tubular T-shaped chassis having a longitudinal portion and an end mounted cross portion;

(b) a pair of front wheels mounted to the cross portion;

(c) steering means including a handle bar, a vertical rotatable steering column tie rod coupled to each of said front wheels;

(d) first and second platform treadles pivotally coupled to said chassis to arcuately rise and fall with operator applied foot pressure;

(e) a housing mounted to the rear of said chassis;

(f) a sprocketed rear wheel rotatively supported from said housing;

(g) a counter-shaft rotatively mounted to said housing in overlying relation to said treadles and including a pair of opposed end-mounted sprockets and a drive sprocket therebetween, each end sprocket rotating about a respective first and second unidirectional over-running clutch means;

(h) a third over-running clutch means mounted to said counter-shaft in counter relation to said first and second clutch means and an arm member coupled between said third clutch means and said housing;

(i) first and second crossover sprockets rotatively mounted to said housing;

(j) a first drive chain having opposite ends coupled to each of said first and second treadles and trained about said end sprockets and said crossover sprockets, where by the alternate rising and falling of said treadles rotates said drive sprocket; and (k) a second endless drive chain trained about said drive sprocket and rear wheel sprocket.

8. A wheeled vehicle comprising:

(a) a tubular T-shaped chassis having a longitudinal portion and an end mounted cross portion;

(b) a pair of front wheels mounted to the cross portion;

(c) steering means including a handle bar, a vertical rotatable steering column tie rod coupled to each of said front wheels;

(d) first and second platform treadles pivotally coupled to said chassis to arcuately rise and fall with operator applied foot pressure;

(e) a housing mounted to the rear of said chassis;

(f) a sprocketed rear wheel rotatively supported from said housing;

(g) a counter-shaft rotatively mounted to said housing in overlying relation to said treadles and including a pair of opposed end-mounted sprockets and a drive sprocket therebetween, each end sprocket rotating about a respective unidirectional over-running clutch means and wherein said counter-shaft includes end passageways communicating with each end-mounted clutch means for admitting lubricant thereto;

(h) first and second crossover sprockets rotatively mounted to said housing;

(i) a first drive chain having opposite ends coupled to each of said first and second treadles and trained about said end sprockets and said crossover sprockets, whereby the alternate rising and falling of said treadles rotates said drive sprocket; and (j) a second endless drive chain trained about said drive sprocket and rear wheel sprocket.

9. A wheeled vehicle comprising:

(a) a tubular T-shaped chassis having a longitudinal portion and an end mounted cross portion;

(b) a pair of front wheels mounted to the cross portion;

(c) steering means including a handle bar, a vertical steering column rotatively supported from said chassis, a plate member mounted to the lower end of said steering column, a pair of tie rods coupled to said plate member, an idler arm member mounted to an outer end of each of said tie rods and a pair of axles, each axle coupled to one of said idler arm members and a vertical portion of each of which axles is rotatively mounted in an inclined tubular sleeve mounted to one end of said chassis cross portion and a horizontal portion of each of which axles is mounted in bearing supported relation to one of said front wheels;

(d) first and second platform treadles pivotally coupled to said chassis to arcuately rise and fall with operator applied foot pressure;

(e) a housing mounted to the rear of said chassis;

(f) a sprocketed rear wheel rotatively supported from said housing;

(g) a counter-shaft rotatively mounted to said housing in overlying relation to said treadles and including a pair of opposed end-mounted sprockets and a drive sprocket therebetween, each end sprocket rotating about a respective unidirectional over-running clutch means;

(h) first and second crossover sprockets rotatively mounted to said housing;

(i) a first drive chain having opposite ends coupled to each of said first and second treadles and trained about said end sprockets and said crossover sprockets, whereby the alternate rising and falling of said treadles rotates said drive sprocket; and (j) a second endless drive chain trained about said drive sprocket and rear wheel sprocket.

10. Apparatus as set forth in claim 9 wherein said steering column comprises a plurality of telescoping concentrically mounted portions and means for adjustably varying the overall height thereof.

11. A wheeled vehicle comprising:

(a) a tubular frame chassis having a longitudinal portion and a forward end mounted cross portion;

(b) a pair of front wheels;

(c) steering means including a handle bar, a vertical steering column supported from said chassis via a plurality of strut members and a steering shaft rotatively coupled in said steering column to a pair of tie rods, wherein each tie rod is secured at an opposite end to an idler arm and wherein each idler arm is coupled to an axle supported from one end of the chassis cross portion and each axle rotatively supports one of said front wheels in toed-in relation to said chassis;

(d) first and second platformed treadles each pivotally coupled to the longitudinal chassis portion adjacent the cross portion to arcuately rise and fall with operator applied foot pressure and each including a stop member contacting the longitudinal frame portion to limit the lowermost treadle travel;

(e) a multi-sprocketed rear wheel rotatively supported from said chassis;

(f) a counter-shaft rotatively mounted to said chassis in overlying relation to said treadles and including a pair of sprockets mounted to opposite shaft ends, an intermediate drive sprocket and non reversing clutch means, each end sprocket rotating about a unidirectional overrunning clutch means and said non reversing clutch means including a counter rotatively mounted clutch means having an arm member mounted between said chassis and said clutch means for preventing the reverse rotation of said counter shaft;

(g) first and second crossover sprockets rotatively mounted to said chassis below the end sprockets;

(h) a first drive chain including a pair of 90 degree transition members having opposite ends coupled to the rear ends of said first and second treadles and trained about the end sprockets and said crossover sprockets, whereby an alternate rising and falling of said treadles rotates said drive sprocket;

(i) a second endless drive chain trained about said drive sprocket and one of the rear wheel sprockets;

(j) cable-actuated means mounted to said chassis for controllably braking at least said rear wheel;

(k) cable-actuated means cooperatively mounted relative to a chain displacement member mounted to said chassis for laterally selectively shifting said second drive chain about a selected one of said rear wheel sprockets; and (l) a housing mounted to said chassis to cover at least said counter shaft and a portion of said first drive chain.

12. A wheeled vehicle comprising:

(a) a tubular frame chassis;

(b) at least one wheel supported from a front-end of said chassis;

(c) steering means including a handle bar, a vertical steering column and a steering shaft supported in said steering column for rotating said front wheel in relation to said chassis;

(d) first and second platformed treadles each pivotally coupled at a forward-end to the forward-end of said chassis to arcuately rise and fall with operator applied foot pressure and each including a stop member contacting the chassis to limit the lowermost treadle travel;

(e) a multi-sprocketed rear wheel rotatively supported from said chassis;

(f) a counter-shaft rotatively mounted to said chassis in overlying relation to said treadles and including a pair of sprockets mounted to opposite shaft ends, an intermediate drive sprocket and non reversing clutch means, each end sprocket rotating about a unidirectional overrunning clutch means and said non reversing clutch means including a counter rotatively mounted clutch means having an arm member mounted between said chassis and said clutch means for preventing the reverse rotation of said counter shaft;

(g) first and second crossover sprockets rotatively mounted to said chassis below the end sprockets;

(h) a first drive chain including a pair of 90 degree transition members having opposite ends coupled to the rear ends of said first and second treadles and trained about the end sprockets and said crossover sprockets, whereby an alternate rising and falling of said treadles rotates said drive sprocket;

(i) a second endless drive chain trained about said drive sprocket and one of the rear wheel sprockets;

(j) cable-actuated means mounted to said chassis for controllably braking at least said rear wheel;

(k) cable-actuated means cooperatively mounted relative to a chain displacement member mounted to said chassis for laterally selectively shifting said second drive chain about a selected one of said rear wheel sprockets; and (l) a housing mounted to said chassis to cover at least said counter shaft and a portion of said first drive chain.

* * * * *